United States Patent [19]
Yamaguchi et al.

[11] Patent Number: 6,145,090
[45] Date of Patent: Nov. 7, 2000

[54] SWITCH CONTROL METHOD OF REDUNDANTLY STRUCTURED COMPUTER SYSTEM

[75] Inventors: Shouzou Yamaguchi; Tomoaki Sato, both of Kawasaki; Akiko Tanno, Nerima-ku; Shinichi Fujimoto, Kokubunji; Hitoshi Sato, Shinjuku-ku; Fumihiro Manome, Setagaya-ku, all of Japan

[73] Assignees: Hitachi, Ltd.; Railway Information Systems Co., Ltd., both of Tokyo, Japan

[21] Appl. No.: 09/145,157

[22] Filed: Sep. 1, 1998

[30] Foreign Application Priority Data

Sep. 5, 1997 [JP] Japan ..................... 9-240570

[51] Int. Cl.$^7$ ..................................... G06F 15/16
[52] U.S. Cl. ........................... 714/4; 714/1; 714/2
[58] Field of Search .................... 714/1, 2, 4, 10, 714/13, 6

[56] References Cited

U.S. PATENT DOCUMENTS

| | | | |
|---|---|---|---|
| 5,513,314 | 4/1996 | Kandasamy et al. | 714/6 |
| 5,592,611 | 1/1997 | Midgely et al. | 714/4 |
| 5,608,865 | 3/1997 | Midgely et al. | 714/1 |
| 5,845,061 | 12/1998 | Miyamoto et al. | 714/4 |

FOREIGN PATENT DOCUMENTS 8-235132   9/1996   Japan .

*Primary Examiner*—Ly V. Hua
*Attorney, Agent, or Firm*—Mattingly, Stanger & Malur, P.C.

[57] ABSTRACT

A client computer, a first server computer, and a second server computer are connected via a network. The client computer executes a transaction process with the first server computer at the normal time. When a fault occurring in the first server computer is detected, first, the client computer requests a connection to the first server computer. When the connection to the first server computer is failed, the client computer requests a connection to the second server computer. When the connection is established, a transaction process is started by the client computer and the second server computer.

7 Claims, 6 Drawing Sheets

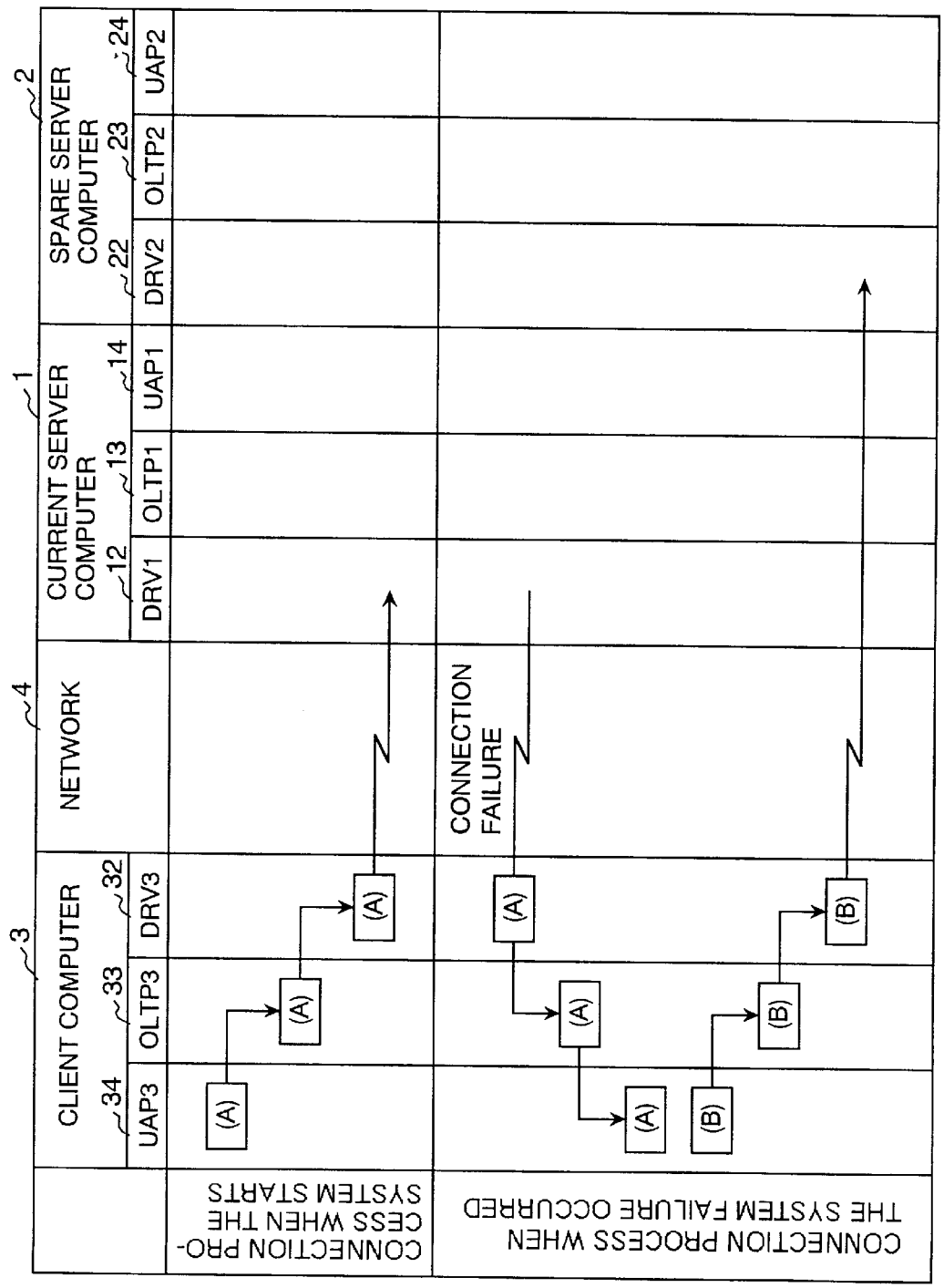

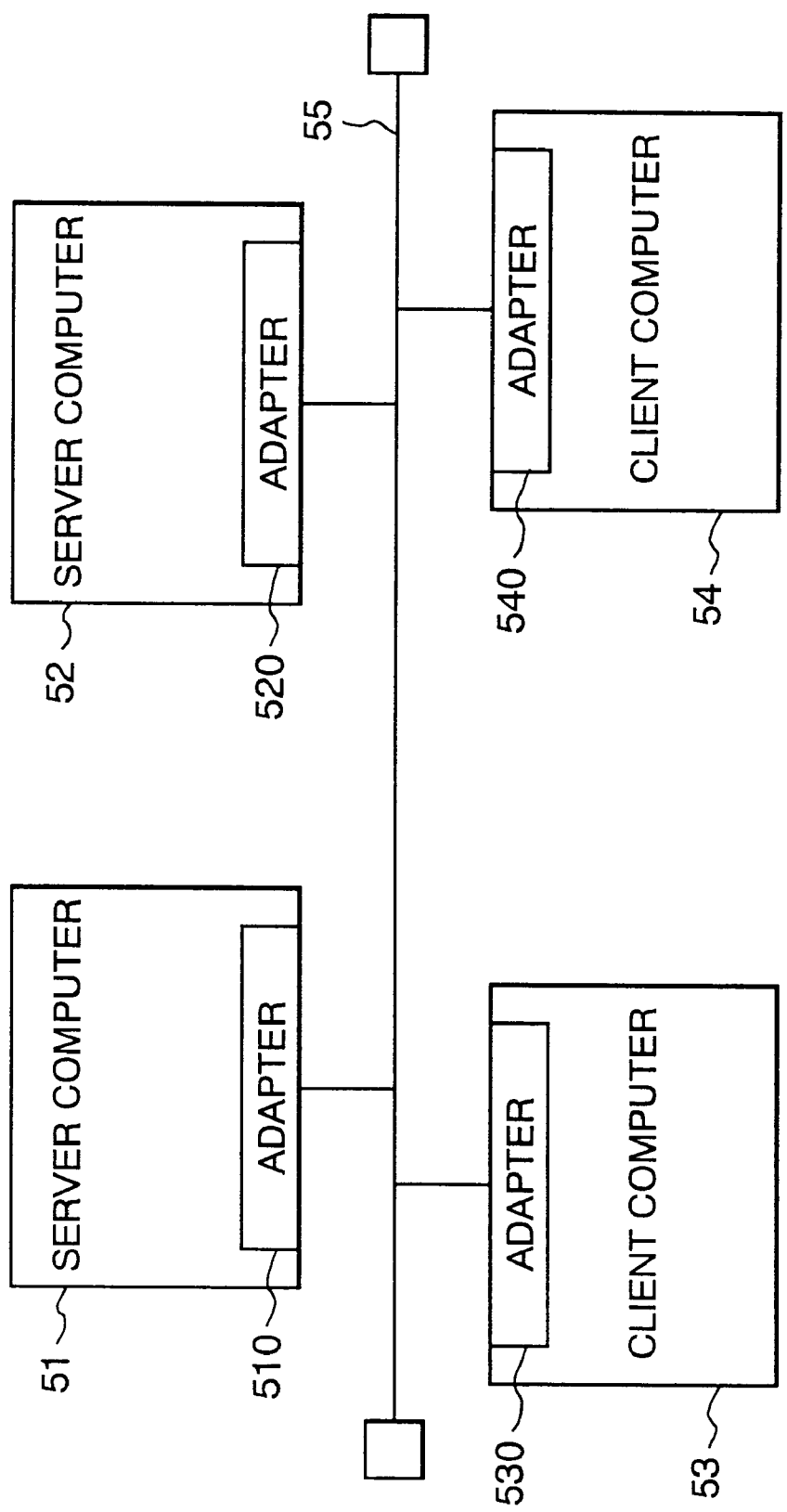

FIG. 6

| ITEM NO. | CLIENT NO. | CURRENT SERVER | SPARE SERVER |
|---|---|---|---|
| 1 | 53 | 51 | 52 |
| 2 | 54 | 52 | 51 |
| 3 | : | | |
| : | : | | |

SWITCH CONTROL METHOD OF REDUNDANTLY STRUCTURED COMPUTER SYSTEM

BACKGROUND OF THE INVENTION

The present invention relates to a technique for automatically switching a current computer to a spare computer in an on-line transaction processing system of a redundantly structured client/server model. More particularly, the invention relates to a switch control method of a redundantly structured system which is suitable for switching the system very reliably when an abnormality occurs.

In a computer system such as a client/server system for executing an on-line transaction process via a network, a redundant structure is usually employed in order to assure the reliability of the system. In the computer system having the redundant structure, another computer system as a spare is prepared for a failure in the current computer system. In the client/server system, when a fault occurs in a current server computer and the connection is switched to a spare server computer, each client computer which receives on-line service has to switch the connection destination address from the address of the current server computer to that of the spare server computer on the basis of a notification from the server computer and then to connect to the spare server computer.

An example of a technique for solving the troublesomeness of the process at the time of switching the system is a technique described in Japanese Patent Application Laid-Open No. 8-235132. In the technique disclosed, a spare host computer controls both of the self address and the address of a current host computer. When a fault occurs in the current host computer, a system switching instruction is transmitted to the spare host computer by a monitoring program. The spare host computer which received the system switching instruction rewrites the self address to the address of the current host computer. In this manner, the system switching operation from the current host computer to the spare host computer is realized. Consequently, the system can be switched from the current host computer to the spare host computer without changing the address of the host computer on the side of a client. According to the technique, however, since the spare host computer rewrites the self address to the address of the current host computer, it is necessary to send a notification of switch control from the current host computer in which a fault occurs to the spare host computer. There is, however, a case such that a monitoring program does not operate normally in the current host computer in which the fault occurs. In this case, the switching operation from the current host computer to the spare host computer cannot be performed.

Generally, the possibility of normal operation of the monitoring program operating in the system in which a fault occurs, especially at the time of a hardware failure, is appreciably diminished.

SUMMARY OF THE INVENTION

As mentioned above, the foregoing conventional technique has a problem of the possibility that a current system in which a fault occurs cannot be switched to a spare system efficiently and certainly.

It is an object of the invention to solve the problem of the convention techniques and to provide a switch control method of a redundantly structured system which can efficiently assure the reliability by the redundant structure of an on-line computer system.

In order to achieve the object, according to the invention, a client computer executes a transaction process with a first server computer at the normal time. When a fault occurring in the first server computer is detected, first, the client computer requests establishment of a connection to the first server computer. When the establishment of the connection to the first server computer is failed, the client computer requests establishment of a connection to a second server computer. When the connection is established, a transaction process is started by the client computer and the second server computer.

According to another embodiment of the invention, a plurality of client computers, a first server computer for executing a transaction process in cooperation with the client computer, and a second server computer for executing a transaction process in cooperation with the client computer are connected via a network. Each of the first and second server computers has a control table in which a server computer to be connected at the normal time and a server computer to be connected when a fault occurs in the server computer to be connected at the normal time are registered with respect to each of the plurality of clients. The first and second server computers check the health of each other. Each of the plurality of client computers requests establishment of a connection to the first server computer and a connection to the second server computer alternately in accordance with generation of a transaction and executes a transaction process with the server computer to which the connection is successfully established. Each of the first and second server computers discriminates whether the request is a request from the client computer to which the self server computer is to be connected at the normal time or not with reference to the control table. In the case where the request is discriminated as a request from the client computer to which the self server computer is not to be connected at the normal time, if it is discriminated from the result of the health check that a fault occurs in the other server computer, the connection is established according to the request. If it is discriminated that the other server computer operates normally, the request is refused. When a fault occurs in the current server computer, the client computer tries to connect to the current server computer. When the connection to the current server computer is failed, a connection to the other server computer as a spare is tried.

BRIEF DESCRIPTION OF THE DRAWINGS

FIG. 4 is an explanatory diagram showing a state of cooperation among programs in system switch control operation;

FIG. 5 is a block diagram showing a second example of the structure of the client/server system to which the switch control method according to the invention is applied; and FIG. 6 is an explanatory diagram showing an example of the structure of a control table used by the server computer to control the client computer.

DESCRIPTION OF THE PREFERRED EMBODIMENTS

Figure 1:
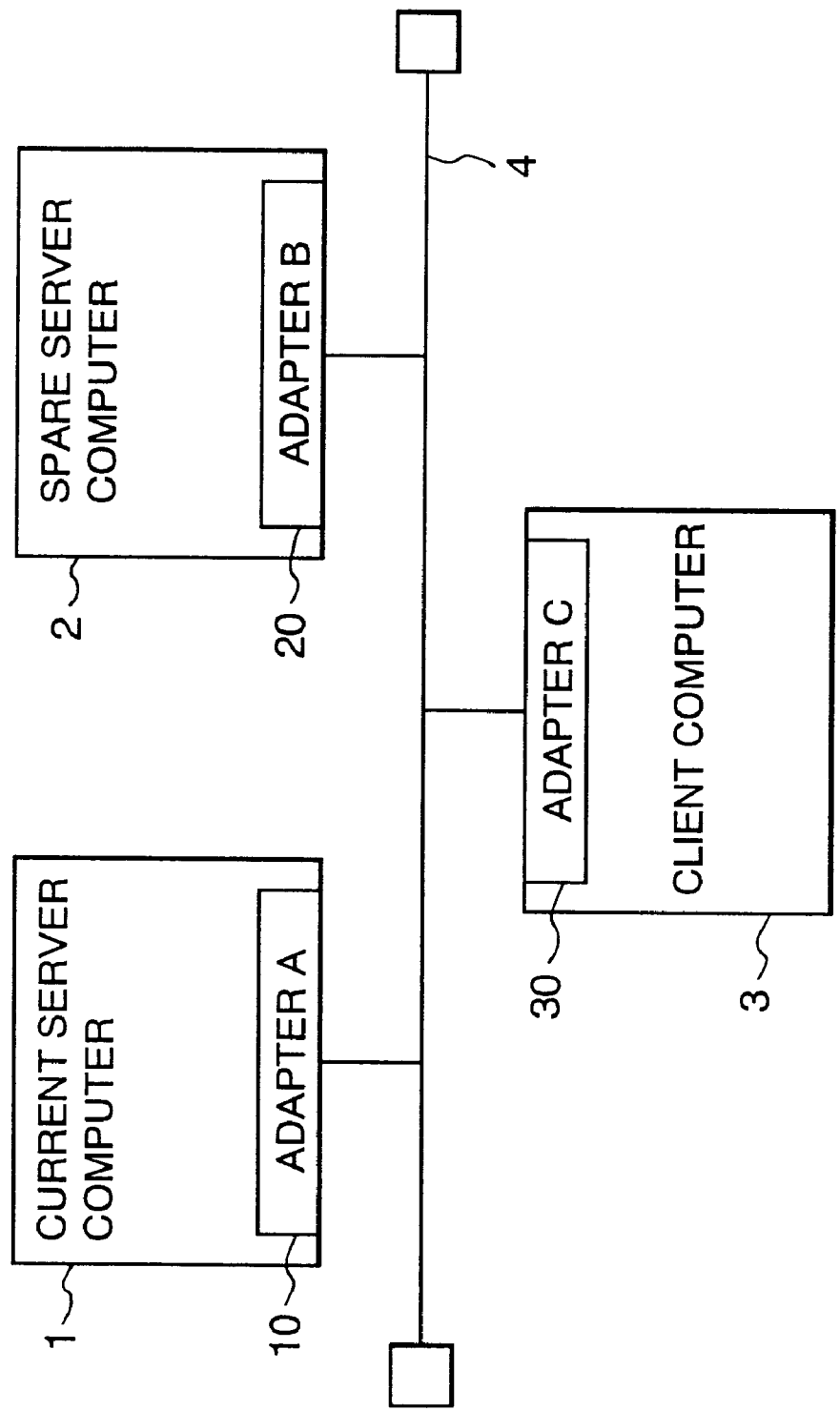
FIG. 1 is a block diagram showing a first example of the structure of a client/server system to which a switch control method of the invention is applied.

FIG. 1 is a block diagram showing an example of the structure of a client/server system to which the invention is applied. In FIG. 1, reference numeral 1 denotes a current server computer; 2 a spare server computer; 3 a client computer; and 4 a network for connecting the server computers 1 and 2 and the client computer 3. The network 4 can be in any form of WAN (Wide Area Network) and LAN (Local Area Network). For the communication on the network 4, a general communication protocol for performing connection by designating the address of a party such as DTE (Data Terminal Equipment) address, IP (Internet Protocol) address, and INS (Intelligent Network System) address can be used.

The server computer 1 and the network 4 are connected via a communication adapter (called adapter A) 10 to which an address "A" is allocated. Similarly, the server computer 2 and the network 4 are connected via an adapter (called adapter B) 20 to which an address "B" is allocated. The client computer 3 and the network 4 are connected via an adapter (called adapter C) 30 to which an address "C" is allocated.

The client computer 3 stores both of the address "A" of the current server computer 1 and the address "B" of the spare server computer 2. The client computer 3 tries to connect to the server computers 1 and 2 alternately and starts an on-line transaction process with the server computer to which the connection is established. In the case where a software fault occurs in the current server computer 1,, when time-out of the transaction or release from the connection with the current server computer 1 is sensed, the client computer 3 discriminates that the on-line transaction process with the current server computer 1 cannot be continued and moves to a connection to the spare server computer 2.

In the case where a hardware fault occurs in the current server computer 1, when a fault in the connection with the current server computer 1 is detected, the client computer 3 discriminates that the on-line transaction process with the current server computer 1 cannot be continued and moves to a connection with the spare server computer 2.

Figure 2:
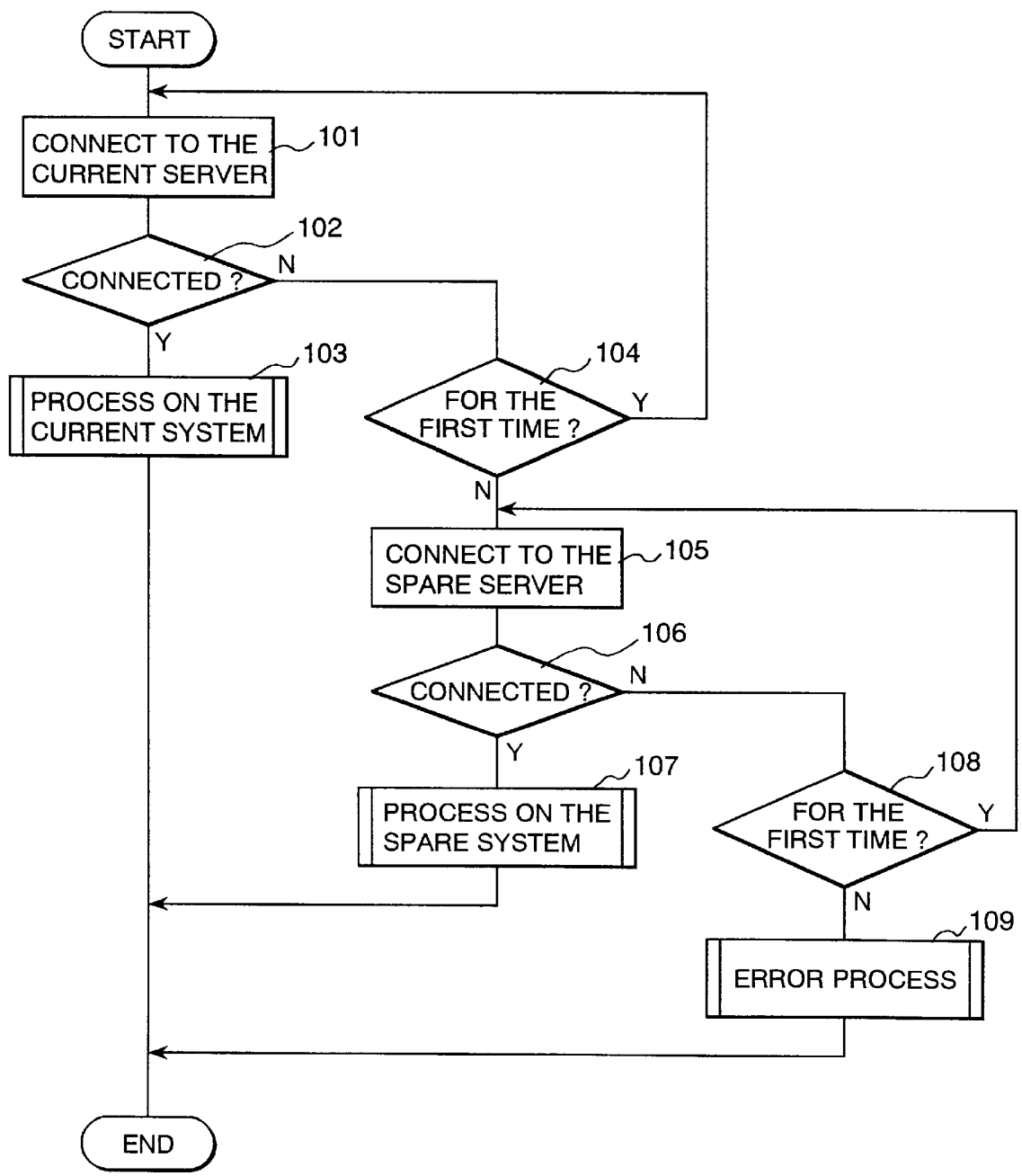
FIG. 2 is a flowchart showing an example of a processing operation according to the system switch control.

FIG. 2 is a flowchart showing a processing operation according to a system switching control in the client/server system in the embodiment.

The client computer 3 first executes a process so as to be connected to the current server computer 1 (step 101). When the connection is succeeded (step 102), a process with the current server computer 1 is performed (step 103). On the other hand, when the connection is failed, whether the failure occurred for the first time or not is discriminated (step 104). If it is the first failure, the processing routine is returned to the process of step 101 and the connection to the current server computer 1 is tried again. If it is a second failure or more, the connection to the spare server computer 2 is executed (step 105). When the connection to the spare server computer 2 is succeeded (step 106), a transaction process is executed with the spare server computer 2 (step 107). When the establishment of the connection is failed, whether the failure occurred for the first time or not is discriminated (step 108). If this is the failure occurred for the first time, the processing routine is returned to the process of step 105 and the process for establishing the connection to the spare server computer 2 is performed. If it is a second failure or more, an error process is executed (step 109). After that, the whole process is finished.

As mentioned above, in the embodiment, both addresses "A" and "B" of the current and spare server computers 1 and 2 are stored in the client computer 3. The process for establishing the connection to the current server computer 1 and that to the current server computer 2 are alternately performed and a process is started with the server computer to which the connection is successfully established. When a fault occurs in the current server computer 1 and the connection to the current server computer 1 is failed, in order to try the connection to the spare server computer 2, the client computer 3 detects the failure of the current server computer 1 and is connected to the spare server computer 2.

Figure 3A:
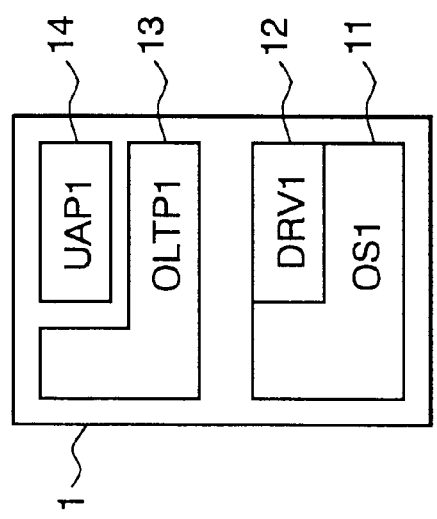
FIG. 3 is a block diagram showing an example of a software structure of server computers and a client computer.
Figure 3B:
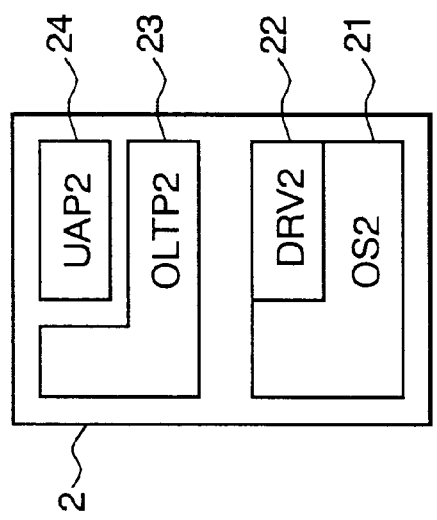
Figure 3C:
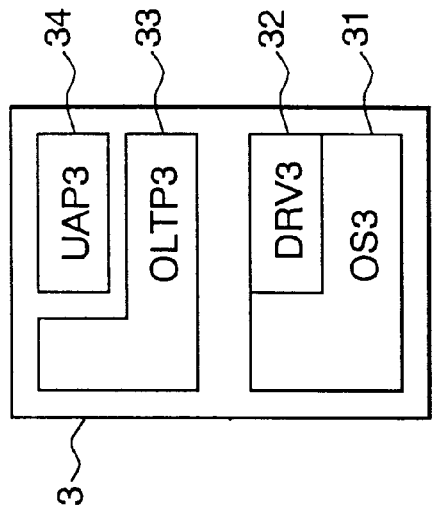

FIG. 3 is a block diagram showing an example of a software structure of each of the server computers 1 and 2 and the client computer 3. As shown in FIG. 3(a) the current server computer 1 comprises as software, an operating system (OS) 11, a network adapter driver program (DRV) 12 operating on the operating system 11, an on-line transaction program (OLTP) 13 existing in the high order of the OS 11 and the DRV 12, and a user application program (UAP) 14. Similarly, as shown in FIG. 3(b), the spare server computer 2 comprises an OS 21, a DRV 22, an OLTP 23, and a UAP 24 as software. The client computer 3 has, as shown in FIG. 3(c), an OS 31, a DRV 32, an OLTP 33, and a UAP 34 as software. The OS 11, DRV 12, OLTP 13, and UAP 14 on the server computer 1 and the OS 21, DRV 22, OLTP 23, and UAP 24 on the server computer 2 are substantially the same, respectively.

FIG. 4 is an explanatory diagram showing a state of cooperation among programs in the system switching control operation. A process for switching the connection to the spare server computer 2 when a fault occurs in the current server computer 1 will be described as an example. In the OLTP 33 in the client computer 3, both of the addresses of the server computers 1 and 2 are defined. The UAP 34 in the client computer 3 refers to the definition and can request the connection establishment to the server computer 1 or 2 in accordance with the OLTP 33. In the beginning of the on-line transaction, the UAP 34 in the client computer 3 alternately tries to establish the connection to the current server computer 1 and the connection to the spare server computer 2. When the connection to the current server computer 1 is established, the UAP 34 in the client computer 3 starts the on-line transaction process in cooperation with the UAP 14 in the current server computer 1.

When a fault occurs in the UAP 14 or the OLTP 13 in the current server computer 1, the UAP 34 in the client computer 3 senses the fault of the server computer 1 by a timeout of a request command. When a fault occurs in the DRV 12 or in the OS 11 in the server computer 1, the UAP 34 in the client computer 3 receives a notification of release from the connection to the server computer 1 from the DRV 33. The UAP 34 can sense the fault in the current server computer 1 by the notification.

When any of the phenomena occurs, the UAP 34 in the client computer 3 requests the connection establishment to the current server computer 1. When the connection to the server computer 1 is not released at this time, the UAP 34 in the client computer 3 requests the OLTP 33 to release the connection and, after that, requests the establishment of the connection. When the establishment of the connection is failed, the UAP 34 requests the OLTP 34 to establish the connection to the spare server computer 2. When the connection to the server computer 2 is established, the UAP 34 in the client computer 3 continues the process with the UAP 24 in the server computer 2. The reason of requesting the establishment of the connection to the current server computer 1 which has been detected faulty is to deal with a case where the cause of the detected fault is not the server computer 1 itself but is the network. Alternatively, after the connection to the current server computer 1 is released, the connection to the spare server computer 2 can be immediately established.

In the above manner, the process with the spare server computer 2 is started. After that, when a fault occurs in the server computer 2, if the server computer 1 is recovered, the server computer 2 can be switched to the server computer 1 by a procedure similar to the switch from the server computer 1 to the server computer 2. That is, when a fault occurs in the server computer 2 and a fault is detected in the connection between the client computer 3 and the server computer 2, the client computer 3 tries to establish the connection to the server computers 1 and 2 alternately. If the server computer 1 has been recovered by this time point, the connection between the server computer 1 and the client computer 3 is established.

As mentioned above, in the embodiment, the current server computer can be automatically switched to the spare server computer without using the monitoring and control programs for hot standby.

FIG. 5 is a block diagram showing an example of the structure of a client/server system according to another embodiment of the invention.

The embodiment has a structure such that two server computers 51 and 52 are connected to at least two client computers 53 and 54 via a network 55. Reference numerals 510, 520, 530, and 540 are communication adapters of the computers. In regular operation, the server computers 51 and 52 divide processes from the plurality of client computers 53 and 54 in order to disperse the load. In the diagram, it is assumed that the client computer 53 uses the server computer 51 as a current server computer and the server computer 52 as a spare server computer. Similarly, it is assumed that the client computer 54 uses the server computer 52 as a current server computer and the server computer 51 as a spare server computer.

In regular operation, the server computer 51 refuses a connection request from the client computer 54 for which the server computer 51 is a spare system. The server computer 52 refuses a connection request from the client computer 53 for which the server computer 52 is a spare system. In order to execute such a control, each of the server computers 51 and 52 holds a control table shown in FIG. 6. In the control table 60, an ID indicative of the current server computer to which the client computer is connected in regular operation and an ID indicative of the spare server computer are set in correspondence to a client number for identifying the client computer. Each of the server computers 51 and 52 checks the health of the other computer. When the other server computer 51 or 52 is healthy, with reference to the control table 60, the connection request from the client 53 or 54 for which the self computer is a spare system is refused. The specific switching process of the embodiment is similar to that in the foregoing embodiments except for the above point and the detailed description is therefore omitted here.

As described above, in the switch control method of the computer system according to the invention, the addresses of the current and spare server computers are stored in the client computer as a terminal side. With reference to the addresses, the connection to the current server computer and that to the spare server computer are alternately tried and a process is started with the server computer to which the connection can be established. When a fault occurs during the operation in the current server computer, the terminal tries to establish the connection to the current server computer. If it is failed, the terminal tries to connect to the spare server computer. When the connection to the spare server computer is established, the terminal executes a process with the connected server computer. In this manner, the automatic detection of a fault in the current server computer and the automatic connection switch to the spare server computer can be realized.

In the foregoing embodiments, without using a monitoring program for monitoring on the server computer side, the server computer in which a fault occurs is automatically switched to the spare server computer by determination on the client computer side. Consequently, even when a hardware fault occurs in the server computer, the connection can be certainly changed to the spare server computer.

The present invention is not limited by the above-mentioned embodiments but can be variously changed without departing from the gist. For example, in the example shown in FIG. 1, when the second-time connection to the spare server computer 2 is failed, the error process is executed. The processing routine can be also returned to step 101 after the failure and the operation from the process for establishing the connection to the current server computer 1 can be repeated. The number of repetition can be also limited.

What is claimed is:

1. A switch control method from a first server computer to a second server computer in a computer system comprising a client computer, said first server computer for executing a transaction process in cooperation with said client computer at the normal time, said second server computer for executing a transaction process in cooperation with said client computer when a fault occurs in said first server computer, and a network for connecting said client computer, said first server computer, and said second server computer, the method comprising the steps of:

executing a transaction process between said client computer and said first server computer;

detecting a fault occurring in said first server computer by said client computer;

requesting establishment of a connection to said first server computer from said client in response to the detection of said fault;

requesting establishment of a connection to said second server computer from said client computer in response to a failure in the establishment of the connection by said request and establishing the connection between said client computer and said second server computer; and starting a transaction process between said client computer and said second server computer.

2. The method according to claim 1, wherein said fault is detected by detecting a time-out in the transaction process with said first server computer by said client computer.

3. The method according to claim 1, wherein said fault is detected by detecting release from the connection with said first computer during the transaction process by said client computer.

4. A control method of switching a server computer in a computer system having a plurality of client computers, a first server computer for executing a transaction process in cooperation with said client computer, a second server computer for executing a transaction process in cooperation with said client computer, and a network for connecting said client computers and said first and second server computers, the method comprising the steps of:

providing each of said first and second server computers of a control table in which a server computer to be connected at the normal time and a server computer to be connected when a failure occurs in the server computer which is to be connected at the normal time are registered with respect to each of said plurality of client computers;

performing a health check of each other by said first and second server computers;

requesting a connection to said first and second server computers alternately in accordance with generation of a transaction by each of said plurality of client computers;

discriminating whether said request is a request from the client computer to which the self server computer is to be connected at the normal time or not with reference to the control table by each of said first and second server computer; and establishing a connection in accordance with said request when it is discriminated that a fault occurs in the other server computer in the case where said request is discriminated as the request from the client computer for which the self server computer is not to be connected at the normal time and refusing said request when it is discriminated that the other server computer operates normally.

5. The method according to claim 4, further comprising the steps of:

executing a transaction process with one of the server computers, to which said client computer has been successfully connected;

detecting a fault occurring in said one of the server computers by said client computer;

requesting establishment of a connection to said one of server computers from said client computer in response to the detection of said fault;

requesting establishment of a connection to other server computer from said client computer in response to a failure in the establishment of the connection by said request and establishing a connection between said client computer and said other server computer; and starting a transaction process between said client computer and said other server computer.

6. The method according to claim 5, wherein said failure is detected by detection of a time-out in the transaction process with said one of the server computers by said client computer.

7. The method according to claim 5, wherein said failure is detected by detection of a release from the connection with said one of the computers during the transaction process by said client computer.

* * * * *